United States Patent
Lopez

(10) Patent No.: US 9,516,964 B2
(45) Date of Patent: Dec. 13, 2016

(54) REUSABLE DRINKING BOTTLE LID WITH COUNTER

(71) Applicant: Carlos A. Lopez, Miami, FL (US)

(72) Inventor: Carlos A. Lopez, Miami, FL (US)

(73) Assignee: PRODUCTOPOP, INC., Miami, FL (US)

( * ) Notice: Subject to any disclaimer, the term of this patent is extended or adjusted under 35 U.S.C. 154(b) by 0 days.

(21) Appl. No.: 13/918,001

(22) Filed: Jun. 14, 2013

(65) Prior Publication Data

US 2014/0367291 A1   Dec. 18, 2014

(51) Int. Cl.
| | |
|---|---|
| *G08B 3/00* | (2006.01) |
| *B65D 85/00* | (2006.01) |
| *A47G 23/16* | (2006.01) |
| *A47G 19/22* | (2006.01) |
| *B65D 51/24* | (2006.01) |

(52) U.S. Cl.
CPC ........... *A47G 23/16* (2013.01); *A47G 19/2266* (2013.01); *B65D 51/24* (2013.01); *B65D 51/245* (2013.01)

(58) Field of Classification Search
CPC ... B65D 51/24; B65D 51/245; A47G 19/2227; B67D 7/20
USPC ............ 116/200, 227, 264, 267, 273, 274; 206/459.1, 459.5; 215/228, 230, 386–389; 220/212, 230, 288; 340/3.1, 3.3, 331, 340/309.4, 691.1, 691.6, 693.1, 693.2, 296.01

See application file for complete search history.

(56) References Cited

U.S. PATENT DOCUMENTS

| | | | | |
|---|---|---|---|---|
| 5,607,078 | A * | 3/1997 | Nordberg et al. | 116/227 |
| 6,084,526 | A * | 7/2000 | Blotky et al. | 340/691.6 |
| 6,252,494 | B1 * | 6/2001 | Howell | 340/309.3 |
| 7,336,194 | B2 * | 2/2008 | Hillman et al. | 340/686.1 |
| 8,446,283 | B2 * | 5/2013 | Pietrorazio | 340/691.3 |
| 8,896,459 | B2 * | 11/2014 | Denison et al. | 340/691.1 |
| 2002/0000908 | A1 * | 1/2002 | Burg et al. | 215/230 |
| 2007/0062277 | A1 * | 3/2007 | Miller | 220/694 |
| 2009/0289026 | A1 * | 11/2009 | Ferrara | 215/230 |

* cited by examiner

*Primary Examiner* — Luan K Bui
(74) *Attorney, Agent, or Firm* — Richard C. Litman

(57) ABSTRACT

The application discloses and claims a beverage container lid that tracks the amount of fluid consumed. The lid has a standard drinking nozzle and engagement means which includes a gasket or standard threading that sealably fit commercially available beverage containers and water bottles. The exterior of the lid has a reset button and a display window through which a display readout is visible that displays the amount of fluid consumed. The lid houses the display, a CPU, battery, sensors and internal housing through which the water flows. The internal housing has a water wheel inside of it with curved blades that are turned by the beverage as it flows out of the lid. Magnets are affixed to one or more of the blades. The CPU tracks the number of times the magnets pass the sensors and translates it into the amount of fluid consumed, which is shown on the display.

8 Claims, 3 Drawing Sheets

REUSABLE DRINKING BOTTLE LID WITH COUNTER

CROSS-REFERENCE TO RELATED APPLICATIONS

Non-applicable

STATEMENT REGARDING FEDERALLY SPONSORED RESEARCH AND DEVELOPMENT

Non-applicable

THE NAMES OF THE PARTIES TO A JOINT RESEARCH AGREEMENT

Non-applicable

INCORPORATION-BY-REFERENCE OF MATERIAL SUBMITTED ON A COMPACT DISC

Non-applicable

BACKGROUND OF THE INVENTION

Field of the Invention

This invention generally relates to beverage containers tops. More specifically, this invention relates to a multifunction, reusable beverage bottle top or lid comprising a counter capable of tracking and displaying the amount of beverage a user consumes.

Description of the Related Art Including Information Disclosed Under 37 CFR 1.97 and 37 CFR 1.98

The following description of the art related to the present invention refers to a number of publications and references. Discussion of such publications herein is given to provide a more complete background of the principles related to the present invention and is not to be construed as an admission that such publications are necessarily prior art for patentability determination purposes.

For a long time, it has been widely believed that drinking at least eight 8-ounce glasses of water daily was a requirement to stay healthy. Some publications and health care experts have disputed the need to consume that exact amount. However, it is undisputed that there are beneficial health effects attendant with being adequately hydrated. The more modern view is that the amount of water the body needs in a daily basis under normal circumstances correlates to the persons weight and muscle mass.

Most modern studies have also confirmed the need to increase one's consumption of water or electrolyte-rich beverages during exercise with the amount of liquid needed correlating to the intensity of the workout. Some of those same studies also recommend that athletes or people who exercise routinely should keep track of the amount of beverages being consumed over pre-determined periods of time. The idea is to insure the consumption of the required amount of beverage before, during and after exercising based on the parameters identified above.

There have been numerous studies that have correlated the decreased risk of certain cancers, notably colon cancer, with an increased water intake. Other proven health benefits derived from proper hydration include improved kidney, digestive and nutritional functions.

Recently there has been a significant increase in consumption of water, as well as markedly trend to carry beverage containers which have become part of the daily routing of a significant portion of the U.S. population. People carrying fluid containers in public while walking, commuting or exercising, especially water, have become an everyday sight. In addition, there has been a huge proliferation of sports drinks, natural juices and nutritional beverages.

The exponential increase of people carrying water and other beverages in numerous facets of daily life has resulted in an equal increase in the variety of fluid containers used. Many people wash and reuse the plastic bottles that originally contained the water or sports drink consumed. Others purchase and use reusable fluid containers of all shapes, sizes, colors and materials.

At least one patent has issued for a water glass reminder. U.S. Pat. No. 5,845,777 to Najmi disclosed and claimed a clear plastic ten ounce glass equipped with a rotatable disc or ring at its base for indexing from one number to the other as water is consumed.

U.S. Pat. No. 5,644,298 to Brooks et al., discloses and claims a drinking container having a serving counter mechanism which can be slidably engaged with the container. The ring member of Brooks et al., comprises a series of numbers printed thereon and a pointing member having a corner. The corner element indicates a number from the number series corresponding to the number of standard sized servings of fluid which the user has consumed over the course of a 23-hour period.

Applicant Lopez, who is also the Applicant in this application, received U.S. Pat. No. 7,581,640, which discloses and claims a beverage cup that comprises a lid. The lid of Lopez comprises a counter means that a user can operate and reset manually to keep track of the number of cups of beverage being consumed.

In contrast, the present invention comprises a new, useful and reusable lid capable of being engaged to commercially available drinking vessels. The lid disclosed and claimed in the present application comprises a counting mechanism capable of tracking and displaying the amount of liquid passing through the lid. Further, the lid of the present invention does not require any manipulation, is capable of being reset and can track and provide the displayed information in various measuring units.

SUMMARY OF THE INVENTION

The present application discloses and claims a lid or top capable of being engaged onto common sizes of beverage bottles and other containers. The lid of the present invention is capable of automatically tracking and displaying the amount of water or any other beverage the user consumes without any manipulation. The lid of the present invention is capable of being reset and can track and provide the amount of consumed beverage in different measuring units and digital displays.

The object of the present invention is to provide a beverage container lid equipped with a counter capable of tracking and displaying the amount of beverage being consumed.

Another object of the present invention is to provide a reusable lid equipped with a beverage counter and capable of being engaged to commercially available beverage containers.

A further object of the present invention is to provide a beverage container lid equipped with a counter capable of tracking and displaying the number of cups, ounces or liters of beverage consumed by the user over a period of time.

BRIEF DESCRIPTION OF THE SEVERAL VIEWS OF THE DRAWINGS

The accompanying drawings, which are incorporated into and form a part of the specification, illustrate an embodiment of the present invention and, together with the description, serve to explain the principles of the invention. The drawings are only for the purpose of illustrating a preferred embodiment of the invention and are not to be construed as limiting the invention.

DETAILED DESCRIPTION OF THE INVENTION

Figure 1:
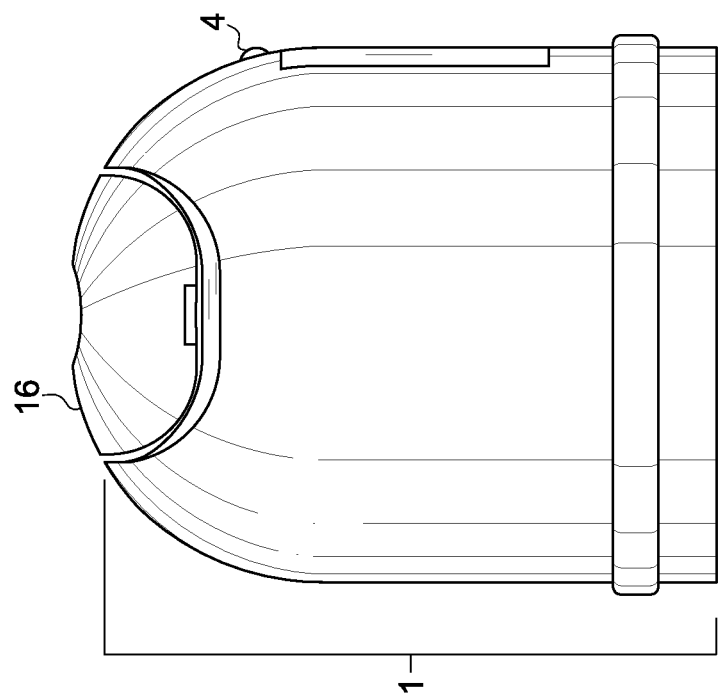
FIG. 1: is front and back elevational views of one embodiment of the outside surface of the lid housing cover.
Figure 1:
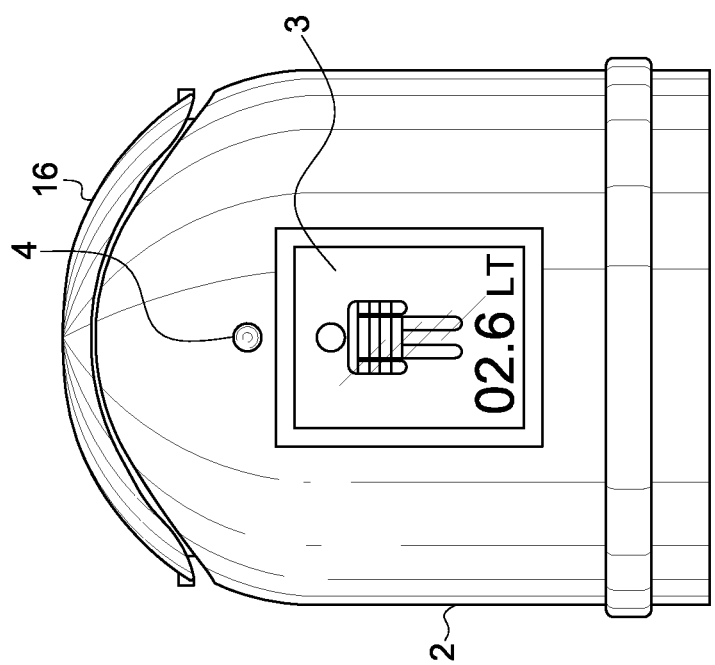

The present application discloses and claims a beverage container lid that tracks the amount of fluid which passes through it. The lid has the required dimensions, and comprises a standard drinking nozzle and an engaging means, preferably standard threading to fit commercially available beverage containers and water bottles. In the preferred embodiment of the invention, the lid is generally dome-shaped, but any shape that is capable of housing the internal elements of the lid is also feasible. There are two layers of housings with a space between. The outer housing (1) of the lid comprises an exterior housing cover (2), with which the user interacts. The inner housing assembly (25) of the lid is a watertight channel through which the liquid flows. The outer housing is capable of interfacing with the neck (40) of a beverage container and the space between the outer housing cover (2) and the inner housing (25) contains a drinking nozzle assembly (15), the inner housing assembly (25), a PCB main board (20), a battery or other powering means (22), and a display readout (23). The purpose of the inner housing is to protect the other internal elements of the lid from liquids. The beverage flows from the container through the inner housing assembly (25) and out the drinking nozzle assembly (15). All other elements of the device do not come into contact with liquids.

The outer housing (1), as shown in FIG. 1, comprises a housing cover (2), a reset button or switch (4) and a transparent display window (3) through which a display readout (23) is visible that displays the amount of beverage consumed. The outer housing acts (1) as a cover for an inner housing assembly (25) through which the liquid flows as well as the electrical assembly (19) that allows tracking of the volume of liquid that flows through the inner housing.

In the preferred embodiment, the housing cover (2) is manufactured as a single piece of plastic. In other embodiments, the housing cover is manufactured in two portions capable of engaging to each other and forming the desired shape when assembled. The housing cover comprises a top portion (5), a bottom portion (6), an inside surface (7), an outside surface (8), a top opening (9), a bottom opening (10), a window opening (11) and a switch opening (12) for the reset switch or button. In embodiments where the housing cover is not monolithic, the window opening (11) can be split between the two portions of the housing cover or can be completely located on one of the portions.

The switch opening (12) is an opening extending from the inside surface (7) to the outside surface (8) of the housing cover capable of housing a reset switch (4) or button. The reset switch or button extends to the exterior of the lid (8), and engages a CPU (24) inside the housing cover (2).

Figure 4:
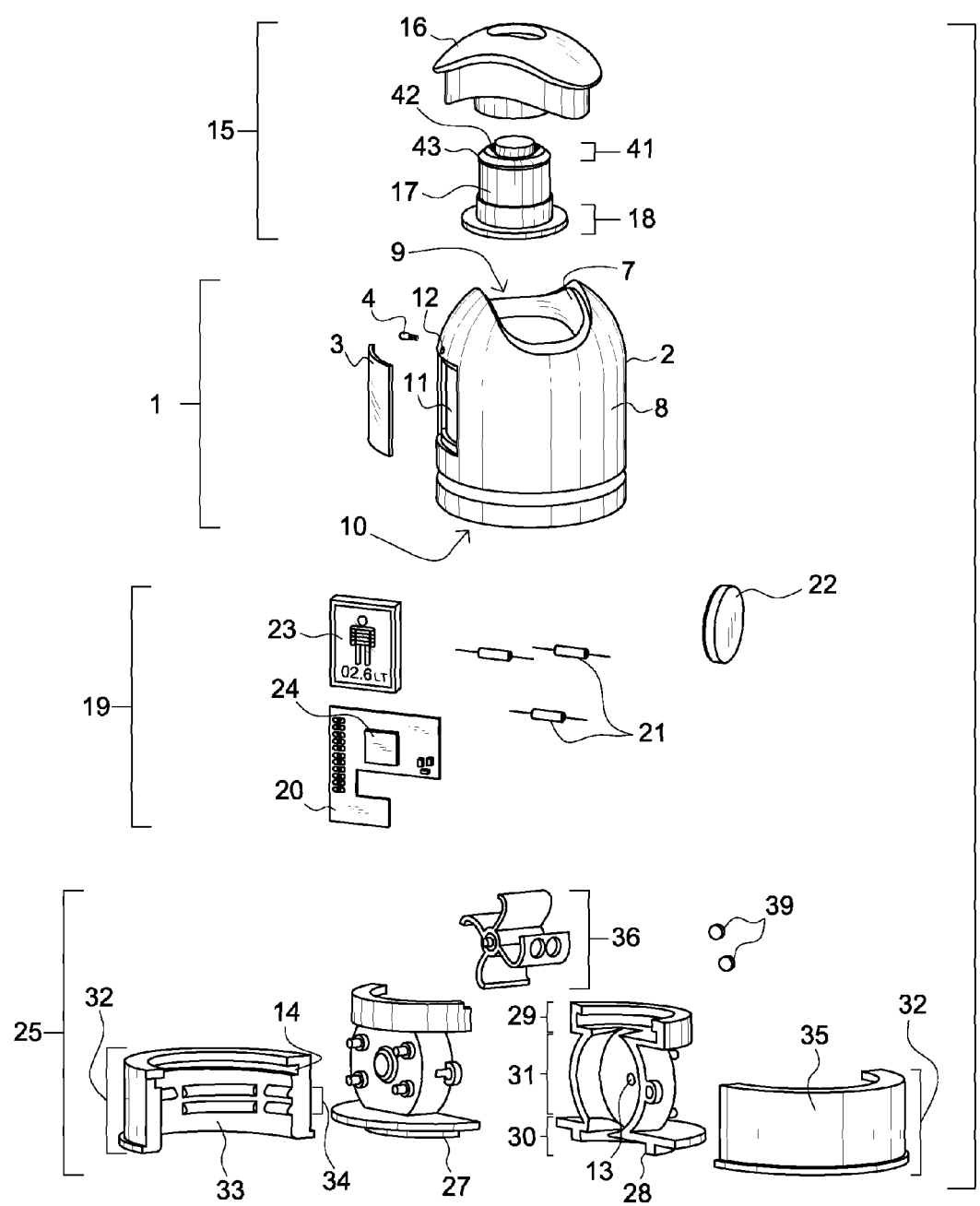
FIG. 4 is an exploded view of the lid's elements.

The inside surface (7) of the housing cover (2) comprises a number of protrusions required to keep the internal elements in place. The inside surface terminates at the bottom opening (10) of the housing cover. The inside bottom portion of the housing cover engages to the engagement means (34) of the inner housing assembly. In the preferred embodiment, the engagement means (34) is a threading portion. The threading portion of the inner housing assembly comprises a hollow ring with internal threading, as depicted in FIG. 4. The internal threading can be manufactured in different thread counts, allowing different lids to engage different sizes of commercially available beverage container. The diameters of the threading portion and the bottom opening (10) of the housing cover can also be manufactured in different diameters to fit over and engage different sizes of beverage container mouths (40). In other embodiments, such as one in which a gasket or rubber seal is affixed inside the inside bottom portion of the housing cover, the diameter of the bottom opening (10) and inside bottom portion of the housing cover can be manufactured in different diameters to allow the lid to engage different sizes of beverage container mouths.

The transparent display window (3) fittingly engages over or into the window opening (11) of the lid's housing cover (2) to create a watertight seal. The display window (3) comprises an interior side and an exterior side. The window is sufficiently transparent to allow a user to see inside the outer housing. On the interior side of the window is a digital display readout (23). The display window (3) can be curved to match the curvature of the housing cover or can be flat, but recessed in embodiments in which the housing is curved.

The internal elements of the invention are a drinking nozzle assembly (15), an electrical assembly (19) and an inner housing assembly (25). The drinking nozzle assembly (15) can take a number of forms, as there are many common drinking nozzles in the art. The preferred embodiment is an oval drinking nozzle (16) and a drinking nozzle insert (17) common to many water bottle designs. However, the drinking nozzle insert of the present invention is hollow. The nozzle is oriented in such a way that it fits within the top opening of the outer housing. The nozzle fits over the insert tightly enough that when the nozzle is pushed down over the insert, liquid cannot pass between them. The user pulls upward on the nozzle to create a gap between the nozzle (16) and the nozzle insert (17) through which liquid can pass. When the nozzle (16) is in the closed position, its top is flush with or continues the curvature of the lid's outer housing.

In the preferred embodiment, the drinking nozzle insert (17) is generally cylindrical and comprises a top (41) with openings (42) through which liquid can pass, a protrusion on the outer circumference, and an open, flanged bottom (18). The flanged bottom (18) of the drinking nozzle insert is engaged to the inner housing assembly (25), which keeps the insert immobile within the lid. The outer circumference of the drinking nozzle insert (17) has a raised rib (43) that keeps the drinking nozzle (16) from pulling off of the insert (17), but allowing the nozzle to move upward to that point on the insert. When the nozzle (16) is pulled upwards by a user, the drinking nozzle extends through the top opening (9) of the housing cover, but no further due to the raised rib (43).

The opening(s) (42) in the top of the nozzle insert (17) are plugged by the drinking nozzle (16) when the drinking nozzle is in the lowered or closed position.

The electrical assembly (19) of the invention is housed in the space between the outer housing (1) and the inner housing assembly (25). The electrical assembly comprises a CPU (24), which is affixed to a PCB board (20), a powering means (22) to power the electrical components, a display readout (23) that is visible through the display window (3), and one or more sensor chips (21). The CPU (24) is also electrically engaged to the reset button (4), which extends from outside the housing to the inside. The CPU (24) is on a PCB main board (20) and is powered by the powering means (22), which is a button cell battery in the preferred embodiment. In alternative embodiments, the powering means (22) can also comprise a small solar panel to recharge the battery. The information flows as follows through the electrical assembly: (1) the sensor chip(s) send a signal to the CPU every time a magnet comes within proximity of the sensor; (2) the CPU tracks the number of times the sensor is activated; (3) the CPU converts the number of activations into the corresponding volume of liquid in cups, ounces, liters, mililiters, deciliters or similar units; (4) the display readout shows the corresponding volume. When the reset button or switch is activated, the CPU resets the count to zero. In alternative embodiments of the invention, the CPU automatically resets after a pre-determined period of time or after a pre-determined amount of beverage has passed through the inner housing assembly's wheel well. In some embodiments, the electrical assembly (19) also comprises a memory chip that is affixed to the PCB main board and is electrically engaged to the CPU. The memory chip can store and record the user's fluid intake over time. In some embodiments, the CPU counts down the amount of fluid the user still needs to consume to meet a pre-determined goal. The CPU can also track how much fluid the user consumes over the pre-determined goal in a pre-determined period of time.

In some embodiments, the electrical assembly (19) comprises an alarm that is electrically engaged to and controlled by the CPU. It can alert the user that a goal has been reached, serve as a reminder that a pre-determined time period is coming to an end, serve as a reminder to the user to drink and many other functions that an audible alarm can serve.

In some embodiments, the electrical assembly (19) also comprises the ability to wirelessly transmit the data the CPU has collected to another electronic device, such as a computer or mobile device. This data can then be tracked and analyzed by a smartphone or computer application, which can then integrate the information into a health and fitness monitoring program or website. Such websites are commonplace and track such data as calorie consumption, exercise, sleep patterns and other health and fitness-related data.

The inner housing assembly (25) is watertight and is the channel through which liquid flows from the beverage container through the nozzle assembly (15) and out of the container. The inner housing assembly (25) serves the additional function of screwing onto the threads on the neck (40) of a beverage container. Each function is carried out by a separate section of the inner housing assembly. The upper portion, called the wheel well portion (26), is the portion through which beverages flow and are monitored. The lower portion is called the engaging portion (32), which comprises a hollow ring with internal threading in the preferred embodiment.

The engaging or threading portion (32) of the inner housing assembly depends from the wheel well portion (26).

The engaging portion (32) comprises a hollow ring with an interior surface (33) and an exterior surface (35). The interior surface comprises a groove (14) around its perimeter and internal threading below the groove. The groove allows the engaging portion (32) to engage the wheel well portion (26) above. The interior surface (33) comprises an engaging means (34). In the preferred embodiment the engaging means (34) is threaded to give it the capability to engage the threaded mouth or neck (40) of a beverage container. The exterior surface (35) is firmly engaged to the inside surface (7) of the bottom portion (6) of the outer housing cover (2). The inner housing assembly (25) fits through the bottom opening (10) of the outer housing cover (2) and is completely enveloped by the outer housing (1). The outer diameter of the engaging portion (32) is very slightly smaller than the inner diameter of the outer housing cover's bottom opening (10), so that it is easy to create a watertight seal between them when assembled. The firm engagement between the outer housing (1) and the inner housing assembly (25) stabilizes the inner housing assembly within the outer housing cover (2) and allows the lid to be threaded onto a beverage container by grasping the outer housing cover and twisting it.

The wheel well portion (26) of the inner housing assembly (25) is manufactured in two portions. In the preferred embodiment, the two portions are halves (27), (28). When assembled, the wheel well has three elements. A top engaging element (29), a bottom engaging element (30) and a round hollow well (31) between them. The top engaging element (29) engages to the flanged bottom (18) of the nozzle insert (17) and protrusions on the inside surface (7) of the outer housing cover (2). The bottom engaging element (30) engages the groove (14) in the engaging portion (32) of the inner housing assembly (25). The two engaging elements hold the inner housing assembly firmly in place within the lid. The hollow well (31) between the two ends is a cylindrical void with an opening through the top engaging element (29) and the bottom engaging element (30) to allow liquids to flow through the wheel well portion (26) of the inner housing.

The water wheel (36) is the mechanism capable of tracking the volume of liquid flowing through the lid. The wheel has three or more curved blades (37) that are turned by the beverage as it flows through the inner housing assembly (25) of the lid. The curvature of the blades is oriented in the opposite direction of water flow. This results in liquid that is moving toward the top opening of the lid catching and turning blades (37) that are curved downward and pushing the blades upward as the liquid flows past. In the preferred embodiment, a long cylindrical axle (38) extends through a center opening of the water wheel. It engages depressions (13) in the center of the wheel well (31) and the water wheel (36) spins freely about the axis (38). In an alternative embodiment of the invention, one portion of the internal housing comprises a cylindrical post through the center of the hollow well (31). The cylindrical post acts as an axle (38) for a water wheel (36) instead of the axle being a separate piece.

One or more wheel well blades (37) has one or more magnets (39) affixed to it. As the blade spins about the axis, the magnets (39) pass sensor chip(s) (21) on the outside of the internal housing one time for every revolution the water wheel (36) makes. A revolution of the water wheel (and therefore the magnet) corresponds to a known volume of water flowing through the water wheel, enabling the CPU (24) to track the volume of fluids consumed from the container.

Figure 3:
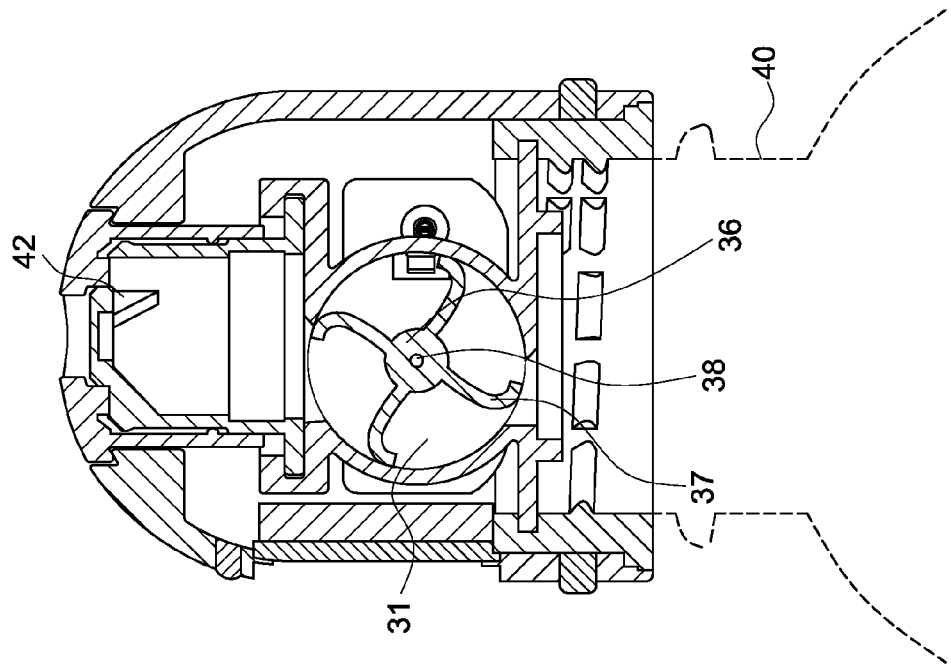
FIG. 3: is a cross-sectional view of the lid of the current invention showing the flow of liquids through the lid.
Figure 2:
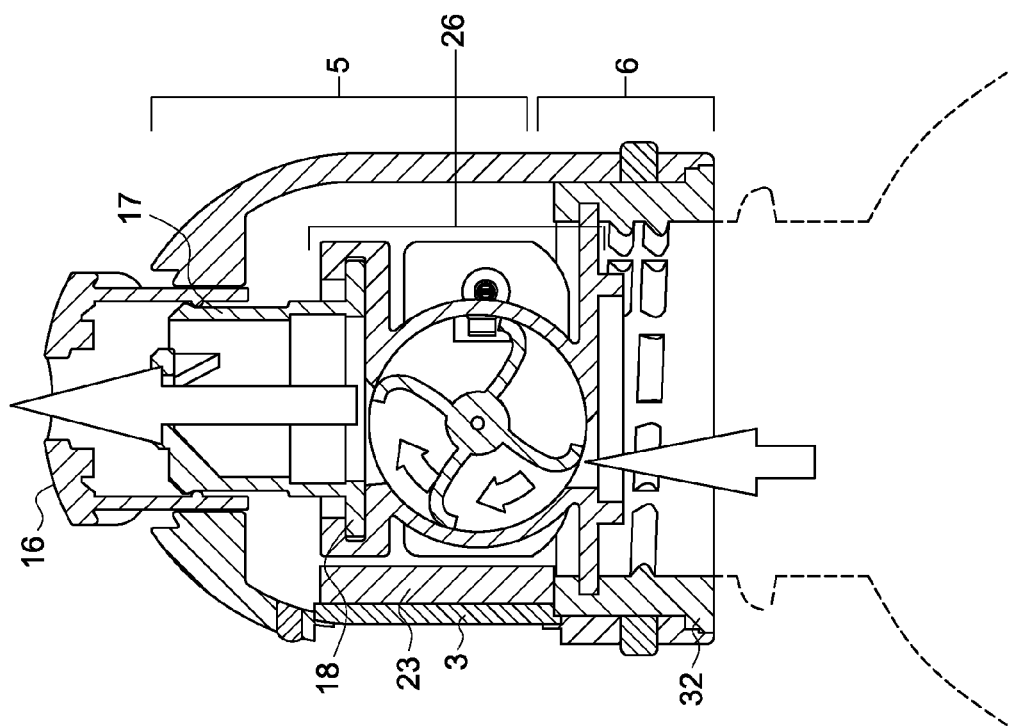
FIG. 2: is a cross-sectional view of the lid of the current invention.

The flow of liquids through the invention is depicted in FIG. 3. Liquids only make contact with the internal housing assembly (25) and the nozzle assembly (15). When the nozzle (16) is opened and the beverage container is tilted back for the user to drink or pour the beverage, the liquid flows through the opening of the bottom engaging element (30) of the wheel well portion and into the hollow well (31). In the hollow well, the liquid pushes upwards on the curved blades (37) of the water wheel (36), causing it to spin. The liquid exits the hollow well through the opening in the top engaging element (29) and enters the drinking nozzle insert (17). If the nozzle (16) is in the open position, the liquid flows out of the lid through the nozzle (16).

What is claimed is:

1. A lid for a beverage container that firmly and sealibly engages commercially available beverage containers and displays and tracks the volume of fluid that passes through it, the lid comprising:
   a. a watertight outer housing, the outer housing comprising a housing cover, a transparent display window and a reset switch;
   b. the housing cover comprising a top portion, a bottom portion, an inside surface, an outside surface, a top opening, a bottom opening, a window opening and an opening that houses the reset switch, the inside surface terminating at the bottom opening of the housing cover;
   c. the transparent display window affixed to the housing cover's window opening in such a way that a user can see inside the housing cover while creating a watertight seal between the housing cover and the window;
   d. the reset switch extending through the opening in the housing cover, the reset switch being interfaced with a CPU;
   e. the outer housing houses a drinking nozzle assembly, an inner watertight housing assembly, an electrical assembly and a display readout;
   f. the drinking nozzle assembly comprising a drinking nozzle and a hollow drinking nozzle insert, the drinking nozzle insert being firmly affixed to the inner watertight housing assembly, the drinking nozzle being movably affixed to the drinking nozzle insert, the drinking nozzle extending through the top opening of the housing cover when upward pressure is applied by a user;
   g. the electrical assembly comprising a PCB main board, one or more sensor chips, a powering means and the display readout, the PCB main board comprising a CPU, the sensor chips being electrically interfaced with the CPU, the display readout interfaced to the CPU and affixed so that it is visible from the display window; and
   h. the inner watertight housing assembly comprising a wheel well portion and an engaging portion, the wheel well portion comprising a first half and a second half, the first half and second half being engaging each other in a watertight manner, the first half and second half each comprising an inner side and an outer side, the first and second halves each comprising a depression in the inner side, a water wheel, the water wheel comprising three or more curved blades and an axis and being a diameter that fits inside the wheel well portion in such a way that it can spin freely about the axis, the water wheel comprising one or more magnets affixed to one or more of the blades, the sensor chips being affixed to the outer side of the wheel well portion and positioned where the sensor chips can track every time a magnet passes a sensor chip, the engaging portion depending from the wheel well portion, the threading portion comprising an interior surface and an exterior surface, the interior surface comprising an engaging means capable of engaging to a mouth of a commercially available beverage container.

2. A lid for a beverage container that firmly and sealibly engages commercially available beverage containers and displays and tracks the volume of fluid that passes through it as in claim 1, wherein the CPU automatically resets the display to zero after a predetermined period of time or after tracking a predetermined volume of fluid.

3. A lid for a beverage container that firmly and sealibly engages commercially available beverage containers and displays and tracks the volume of fluid that passes through it as in claim 1, wherein the PCB board comprises a memory chip that stores and records the user's fluid intake over time.

4. A lid for a beverage container that firmly and sealibly engages commercially available beverage containers and displays and tracks the volume of fluid that passes through it as in claim 1, wherein the CPU can be manually reset to zero at any time using the reset switch.

5. A lid for a beverage container that firmly and sealibly engages commercially available beverage containers and displays and tracks the volume of fluid that passes through it as in claim 1, wherein the PCB board comprises a memory chip that stores and records the user's fluid intake over time, and the CPU is programed to audibly or visually signal the consumption of beverage over a pre-programed period of time and how much volume of beverage over or under a pre-set amount the user has consumed over a pre-programmed period of time.

6. A lid for a beverage container that firmly and sealibly engages commercially available beverage containers and displays and tracks the volume of fluid that passes through it as in claim 1, wherein the powering means is a battery or a battery and a small solar cell affixed to the outside surface of the housing cover.

7. A lid for a beverage container that firmly and sealibly engages commercially available beverage containers and displays and tracks the volume of fluid that passes through it as in claim 1, wherein the PCB board further comprises a wireless data transmission that can transmit information gathered by the CPU wirelessly to a computer or mobile device.

8. A lid for a beverage container that firmly and sealibly engages commercially available beverage containers and displays and tracks the volume of fluid that passes through it as in claim 1, wherein the engaging means is selected from the group consisting of threading and a rubber seal.

* * * * *